UNITED STATES PATENT OFFICE.

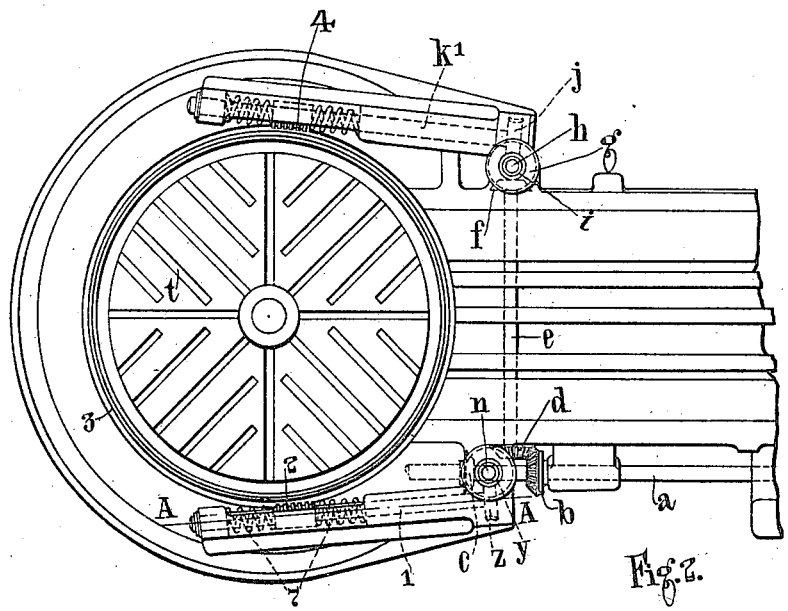
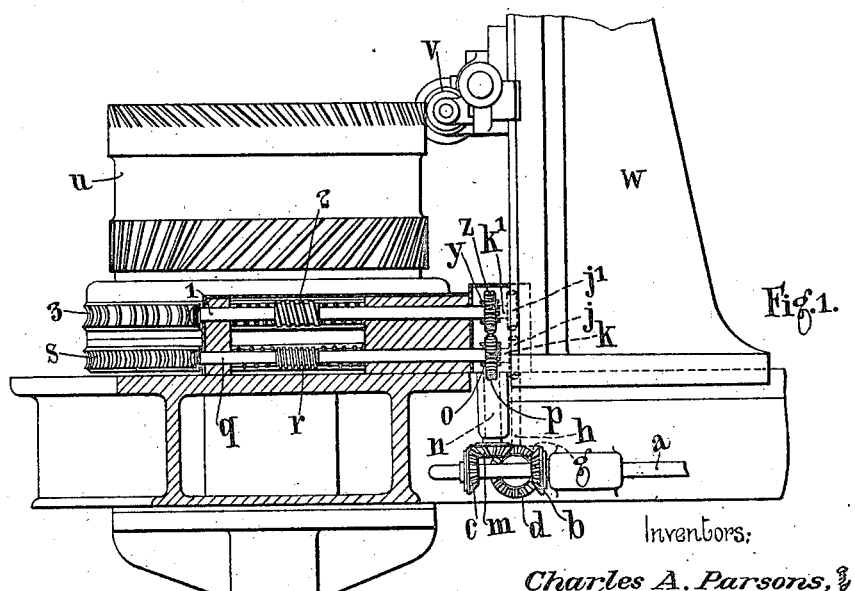

CHARLES ALGERNON PARSONS, OF NEWCASTLE-UPON-TYNE, AND STANLEY SMITH COOK, OF WALLSEND, ENGLAND; SAID COOK ASSIGNOR TO SAID PARSONS.

FORMATION OF GEAR-WHEEL TEETH.

1,220,542.      Specification of Letters Patent.      Patented Mar. 27, 1917.

Original application filed March 25, 1913, Serial No. 756,760. Divided and this application filed June 24, 1916. Serial No. 105,756.

*To all whom it may concern:*

Be it known that we, CHARLES ALGERNON PARSONS, a subject of the King of Great Britain and Ireland, and residing at Heaton Works, Newcastle-upon-Tyne, in the county of Northumberland, England, and STANLEY SMITH COOK, a subject of the King of Great Britain and Ireland, and residing at Turbinia Works, Wallsend-on-Tyne, in the county of Northumberland, England, have invented certain new and useful Improvements in and Relating to the Formation of Gear-Wheel Teeth, of which the following is a specification.

This invention relates to the method of and means for forming the teeth of gear wheels such as are described in co-pending application Serial Number 756760 filed 25th March 1913.

Referring now to the accompanying diagrammatic drawings:—

Figures 1 and 2 represent in elevation and plan respectively a portion of a gear cutting machine embodying the present invention and employing four driving worms, the sectional part of Fig. 1 being taken on the line A—A Fig. 2.

Figure 3:
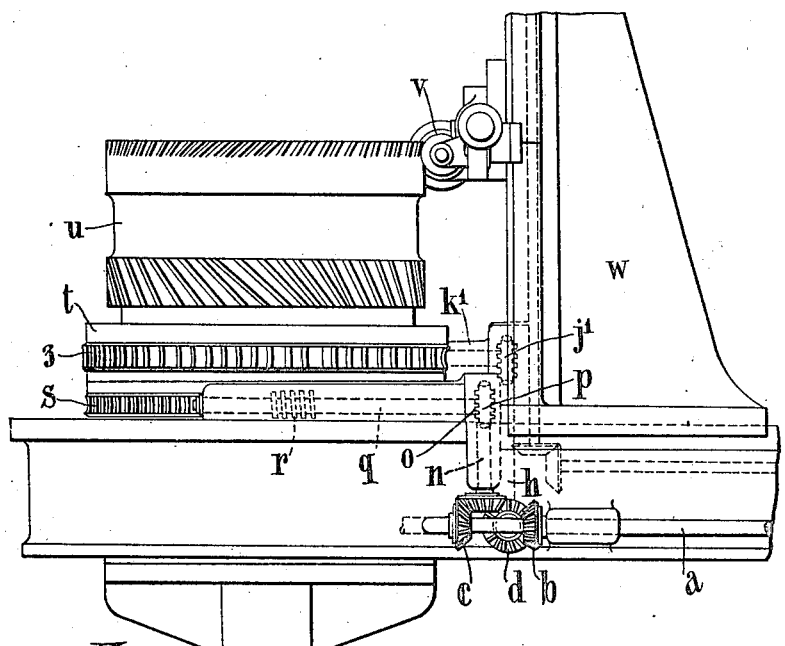
Fig. 3 is a side elevation view illustrating a portion of the modified form of gear cutting machine embodying the present invention in which two worm wheels, each with a single driving worm, are employed.

In carrying this invention into effect in a gear cutting machine as shown in Figs. 1 and 2, the shaft $a$ (hereinafter referred to as the driving shaft) carries two bevel wheels $b$, $c$.

The bevel wheel $d$ engages with a bevel wheel $b$ and is mounted on a shaft $e$ extending across the bed of the machine. This shaft $e$ at its farther end is provided with a second bevel wheel $f$ engaging with a bevel wheel $g$ mounted on a vertical spindle $h$ which carries two worms of which only one, viz., $i$ is shown in Fig. 2.

Engaging with these latter worms are worm wheels $j$ and $j'$ on spindles $k$ and $k'$.

A similar arrangement is provided in connection with the second bevel wheel $c$ on the driving shaft $a$. The bevel wheel $c$ engages with the bevel wheel $m$ on the vertical shaft $n$ which carries two worms $o$ and $y$. The worms $o$ and $y$ engage with worm wheels $p$ and $z$ on spindles $q$ and 1 on which are mounted worms such as $r$ and 2.

The worm $r$ engages with the worm wheel $s$ and the worm 2 with the worm wheel 3, both of which wheels are attached to the table $t$ on which the work $u$ is mounted. The worms on the vertical shaft $h$ are similarly arranged to transmit their rotation to the table $t$ through two worms engaging with the worm wheels $s'$ and 3 respectively. Only one of these latter worms, viz., 4, is visible in the drawings.

It will be seen that the rate of movement of the table $t$ is controlled by the four worms and any irregularity in the movement of this table, arising from an irregularity in any of the worms or from irregularity in the teeth of either of the worm wheels $s$ or 3 passing in contact with one of said worms, is checked by the engagement of the other worms with the worm wheels.

It is desirable that the portion of the circumferential length along the pitch circle between the point of contact of the two worms with the particular worm wheel with which they are in engagement should not comprise exactly a whole number of tooth spaces, but should include a fraction of a tooth space so that these points of contact do not simultaneously correspond to similar parts of the teeth.

Also, it is in general preferred to place the individual worms of each pair of worms so that the circumferential distance between them is half a pitch distance greater or less than the half circumference of the worm wheel, so that their engagements are in opposite phase both as regards the period of rotation of the work and as regards individual teeth of the driven wheel.

In some cases it may be necessary to provide springs to obtain an approximately equal division of the driving force between the worms, but generally the natural elasticity of the shafts and supporting structure will be sufficient for this purpose.

As an example in the use of springs for this purpose, springs such as 7 may be inserted on either side of the worms which engage the worm wheels $s$ and 3. When such springs are provided these worms are splined to their shafts so as to be rotated by the shafts but free to move longitudinally upon the shafts.

It will be understood that the springs are placed under an initial compression when inserted into place and that they abut on one side against the end of the worm and on the other against a fixed portion of the machine structure, such as the end of the bearing carrying the worm shaft, or a collar attached to the shaft.

In order to break the correspondence of the periodicity of the irregularities in the rate of movement of the table due to irregularities in any of the four worms, or in either of the worm wheels, the latter are preferably made with teeth of different pitch, the worms engaging with one worm wheel being, of course, of corresponding pitch. The worms engaging with one worm wheel will then have to be rotated at a different speed to those in engagement with the other worm wheel, and this difference of speed is suitably provided for in the means connecting the driving shaft $a$ with the spindles on which the worms are mounted. The teeth of the worm wheels, $s$ and 3, particularly when these wheels are made of the same pitch, may be interpitched circumferentially, by which we mean that the worm wheel $s$ has double the number of teeth as the wheel 3, and this being the case there will be a tooth on wheel $s$ opposite every space between the teeth on wheel 3, this being the arrangement illustrated in Fig. 1.

Figure 4:
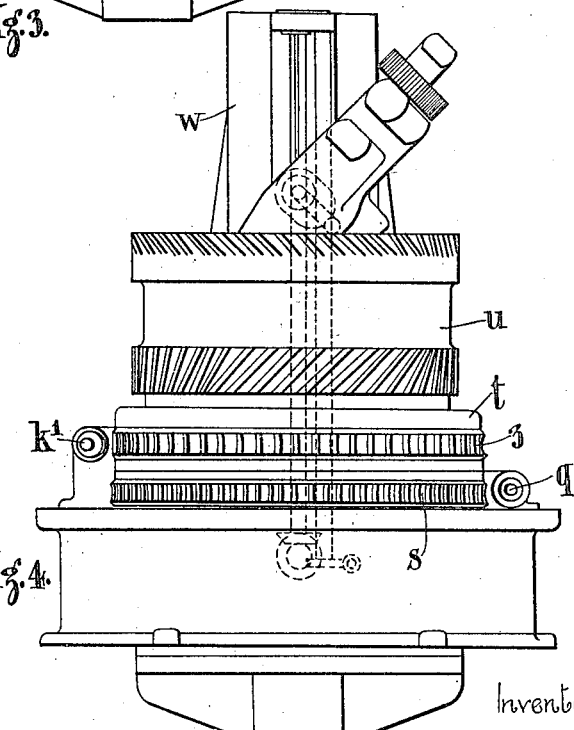
Fig. 4 is an end elevation of Fig. 3.

Only a single worm driving each of the worm wheels, $s$ and 3, may be provided if desired, (see Figs. 3 and 4) these single worms rotating at the same or different speeds according as to whether the worm wheels, $s$ and 3, are provided with teeth of similar or different pitch. In the form shown in Figs. 3 and 4 the teeth of the wheel $s$ are of finer pitch than the teeth of the wheel 3.

In this manner the angular movement of the work is made to register with the average configuration of the parent gear, and consequently the errors which would be introduced by any of the separate drives are eliminated or at least greatly reduced.

It will be seen that the relative position of the member forming the teeth and the wheel on which the teeth are being formed is determined by the general or average configuration of the members of the parent gear.

Having now described our invention, what we claim as new and desire to secure by Letters Patent, is:—

1. A gear cutting machine comprising in combination a work-table, a plurality of driven means attached to said table, and a plurality of sets of driving means, each of said sets engaging with one of said driven means.

2. A gear cutting machine comprising in combination a work table, worm wheels attached to said table, a plurality of worms, said worms engaging with said worm wheels in pairs, and means between the worms of each pair to equalize the driving forces between them.

3. In a gear cutting machine, in combination, a work table, multiple driven means attached to said table, multiple sets of multiple driving means, each of said sets engaging with one of said driven means.

4. In a gear cutting machine, in combination, a rotatable work table, multiple driven means attached to said table, multiple driving means engaging with each of said driven means, and means to equalize the turning moments upon the several driven means.

5. In combination in a gear cutting machine, a work table, multiple driven gear means attached to said table, all of said gear means having different tooth pitches and multiple driving means engaging with said driven means.

6. In combination in a gear cutting machine, a work table, multiple driven gear means attached to said table, all of said gear means having different tooth pitches, multiple driving means engaging with said driven means, and means for interconnecting said multiple driving means.

7. In combination in a gear cutting machine, a work table, multiple worm wheels upon said table, said worm wheels having different tooth pitches, worms engaging with each of said worm wheels, and interconnecting means between said worms to transmit driving forces thereto.

8. In combination in a gear cutting machine, a work table, two driven gear means attached to said table, said gear means having different tooth pitches, and multiple driving means engaging with each of said driven means.

9. In combination in a gear cutting machine, a work table, two driven gear means attached to said table, said gear means having different tooth pitches, multiple driving means engaging with each of said driven means, and means for interconnecting said multiple driving means to transmit driving forces thereto.

10. In combination in a gear cutting machine a work table, two worm wheels attached to said table, said worm wheels having different tooth pitches, multiple worms engaging with each of said worm wheels, and interconnecting means between said worms to transmit driving forces thereto.

11. In combination in a gear cutting machine, a work table, two worm wheels upon said table, said worm wheels having different tooth pitches, worms engaging with each of said worm wheels, and interconnecting means between said worms to transmit driving forces thereto.

12. In combination in a gear cutting machine, a work table, two worm wheels on said table, said worm wheels having different tooth pitches, worms engaging with each of said worm wheels, said worms being in opposite phase relation as regards the angular position of their points of engagement with the worm wheels, and also as regards their points of engagement with the individual teeth of said wheels.

13. In combination in a gear cutting machine, a work table, multiple worm wheels attached to said table, said worm wheels having different tooth pitches, multiple worms engaging with each of said worm wheels and differential interconnecting means between said worms to transmit to the work table equal driving moments.

14. A gear cutting machine comprising in combination a work-table, a plurality of driven means attached to said table, a plurality of sets of driving means, said driving means engaging with said driven means in pairs and means between said driving means of each pair to equalize the driving forces between them, substantially as described.

In testimony whereof, we have affixed our signatures.

CHARLES ALGERNON PARSONS.
STANLEY SMITH COOK.